United States Patent
Aryal et al.

(10) Patent No.: US 9,376,018 B2
(45) Date of Patent: Jun. 28, 2016

(54) SYSTEM AND METHOD FOR DETERMINING WHEN A TASK MAY BE PERFORMED ON A VEHICLE

(75) Inventors: Bijaya Aryal, Macomb Township, MI (US); Linda S. Angell, Grosse Pointe Farms, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 1853 days.

(21) Appl. No.: 12/465,505

(22) Filed: May 13, 2009

(65) Prior Publication Data
US 2010/0289633 A1 Nov. 18, 2010

(51) Int. Cl.
*B60Q 1/00* (2006.01)
*B60K 35/00* (2006.01)

(52) U.S. Cl.
CPC ............ *B60K 35/00* (2013.01); *B60K 2350/906* (2013.01)

(58) Field of Classification Search
CPC .. B60K 35/00; B60K 28/066; B60R 16/0236; G08B 21/06; B60Q 9/00
USPC ............... 340/438, 439, 575, 576; 455/404.1, 455/404.2, 405, 410, 414.1
See application file for complete search history.

(56) References Cited

U.S. PATENT DOCUMENTS

| | | | |
|---|---|---|---|
| 6,687,497 B1* | 2/2004 | Parvulescu et al. | 455/420 |
| 6,882,906 B2 | 4/2005 | Geisler et al. | |
| 6,995,663 B2 | 2/2006 | Geisler et al. | |
| 7,202,793 B2* | 4/2007 | Grace et al. | 340/576 |
| 7,505,784 B2* | 3/2009 | Barbera | 455/557 |
| 7,532,958 B2 | 5/2009 | Powers et al. | |
| 7,697,917 B2* | 4/2010 | Camp et al. | 455/345 |
| 2002/0016653 A1* | 2/2002 | Levine | 701/1 |
| 2004/0056758 A1* | 3/2004 | Schwartz | 340/5.2 |
| 2009/0088928 A1* | 4/2009 | Schroeder et al. | 701/45 |
| 2009/0215466 A1* | 8/2009 | Ahl et al. | 455/456.1 |
| 2010/0323657 A1* | 12/2010 | Barnard et al. | 455/404.1 |
| 2011/0028139 A1* | 2/2011 | Odom | 455/418 |
| 2011/0136509 A1* | 6/2011 | Osann, Jr. | 455/456.3 |

* cited by examiner

*Primary Examiner* — Kerri McNally
(74) *Attorney, Agent, or Firm* — Ingrassia Fisher & Lorenz, P.C.

(57) ABSTRACT

Methods and apparatus are provided for determining when a task may be performed on a vehicle that is moving. The method includes generating a driver workload value based on at least one task parameter describing a predetermined attribute of the task and preventing a user from performing the task if the driver workload value exceeds a predetermined driver workload threshold and the vehicle is moving.

19 Claims, 2 Drawing Sheets

SYSTEM AND METHOD FOR DETERMINING WHEN A TASK MAY BE PERFORMED ON A VEHICLE

TECHNICAL FIELD

The present invention generally relates to vehicle information and driver interaction management, and more particularly relates to a system and method for determining when a task may be performed on a vehicle.

BACKGROUND OF THE INVENTION

Increasingly, automobiles and other vehicles are being equipped with user interfaces that enable a driver to interact with one or more vehicular systems. Typically, these user interfaces include an electronic display for rendering graphic, iconic, and/or textual content and an input interface for receiving input from the driver. For example, a vehicle may include a touch-screen display for rendering various graphical user interfaces (GUIs) and other content (e.g., mapping content, video content, etc.) that allow the driver to interact with a vehicular infotainment system. User interfaces such as this enable the driver of a vehicle to perform various functions that enhance the experience of the driver.

One area of concern with such user interfaces is that they have the potential to divert the driver's eyes away from the road for extended periods of time, reducing the driver's ability to control the vehicle or to react to changing road and traffic conditions. To address this issue, some user interfaces are configured to prevent the driver from viewing (e.g., to "lock-out") certain visually intense or distracting content whenever the vehicle is moving. For example, a user interface may be configured to lock-out an entire menu-based interface while the vehicle is moving because the menu-based interface includes menus and submenus having a large number of categories that have the potential to distract the driver.

One issue with this approach is that some user interface content that has the potential to distract the driver in certain instances may not be distracting under all circumstances. For example, a menu-based interface that includes menus that have the potential to distract the driver may also include menus having relatively few categories that the driver can review quickly without being distracted for an extended period of time. In addition, it may be possible for a driver to interact with appropriately structured content under certain driving conditions (e.g., when the vehicle is moving slowly or when the vehicle is moving at a constant speed on a level road where visibility is high and traffic is light) without adversely affecting the driver's performance. Thus, locking-out user interface content without regard to the structure of the content or to current driving conditions can prevent the driver from performing desired functions while the vehicle is moving, potentially decreasing driver satisfaction with the vehicle.

Accordingly, it is desirable to provide a system and method for locking-out user interface content based on attributes related to the structure of the content and attributes related to the vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a method is provided for determining when a task may be performed on a vehicle that is moving. The method includes generating a driver workload value based on at least one task parameter describing a predetermined attribute of the task and preventing a user from performing the task if the driver workload value exceeds a predetermined driver workload threshold and the vehicle is moving.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be understood that FIGS. 1-2 are merely illustrative and, particularly with respect to FIG. 1, may not be drawn to scale.

Figure 1:
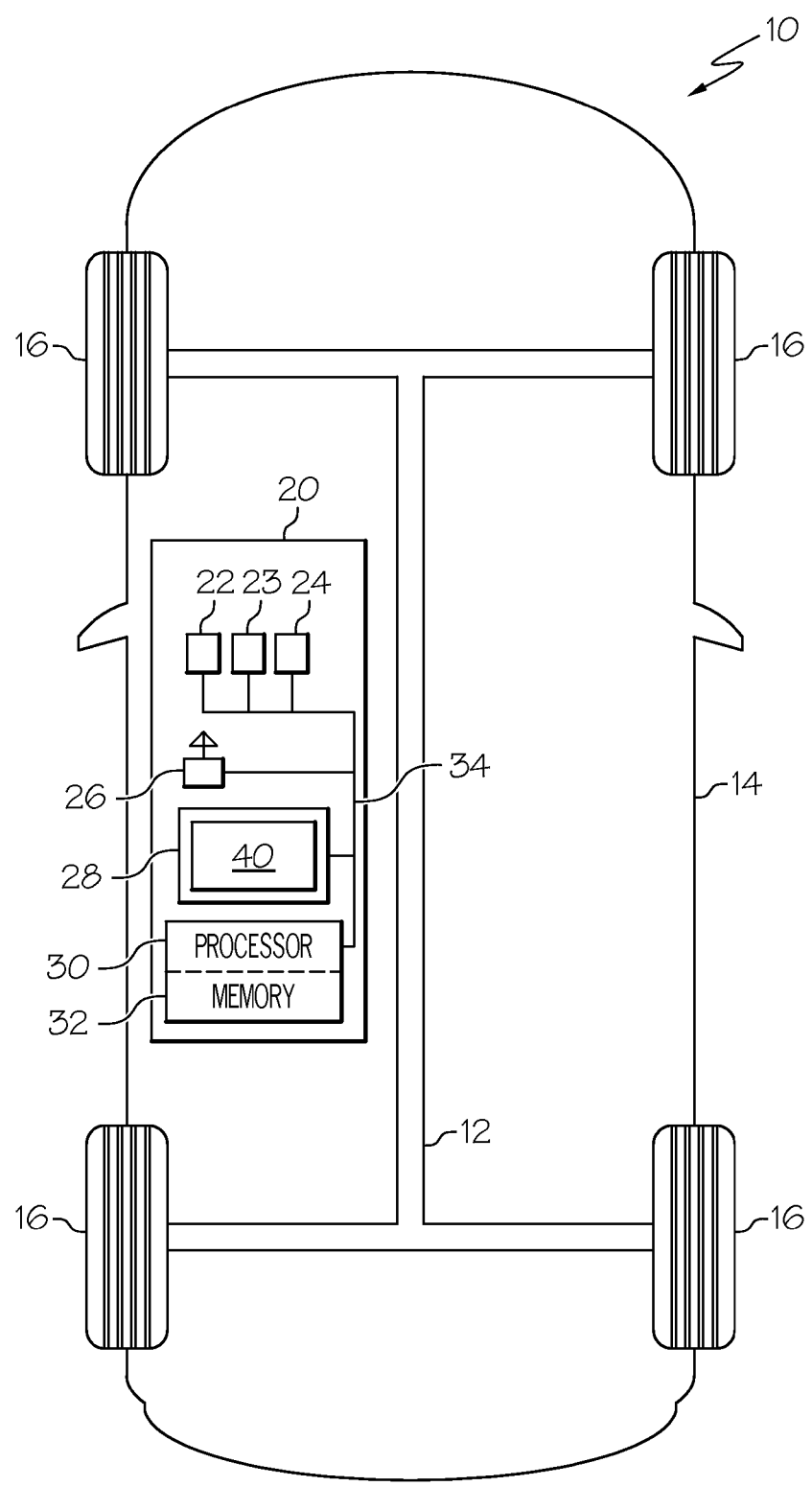
FIG. 1 is a block diagram of an exemplary vehicle according to one embodiment.
Figure 2:
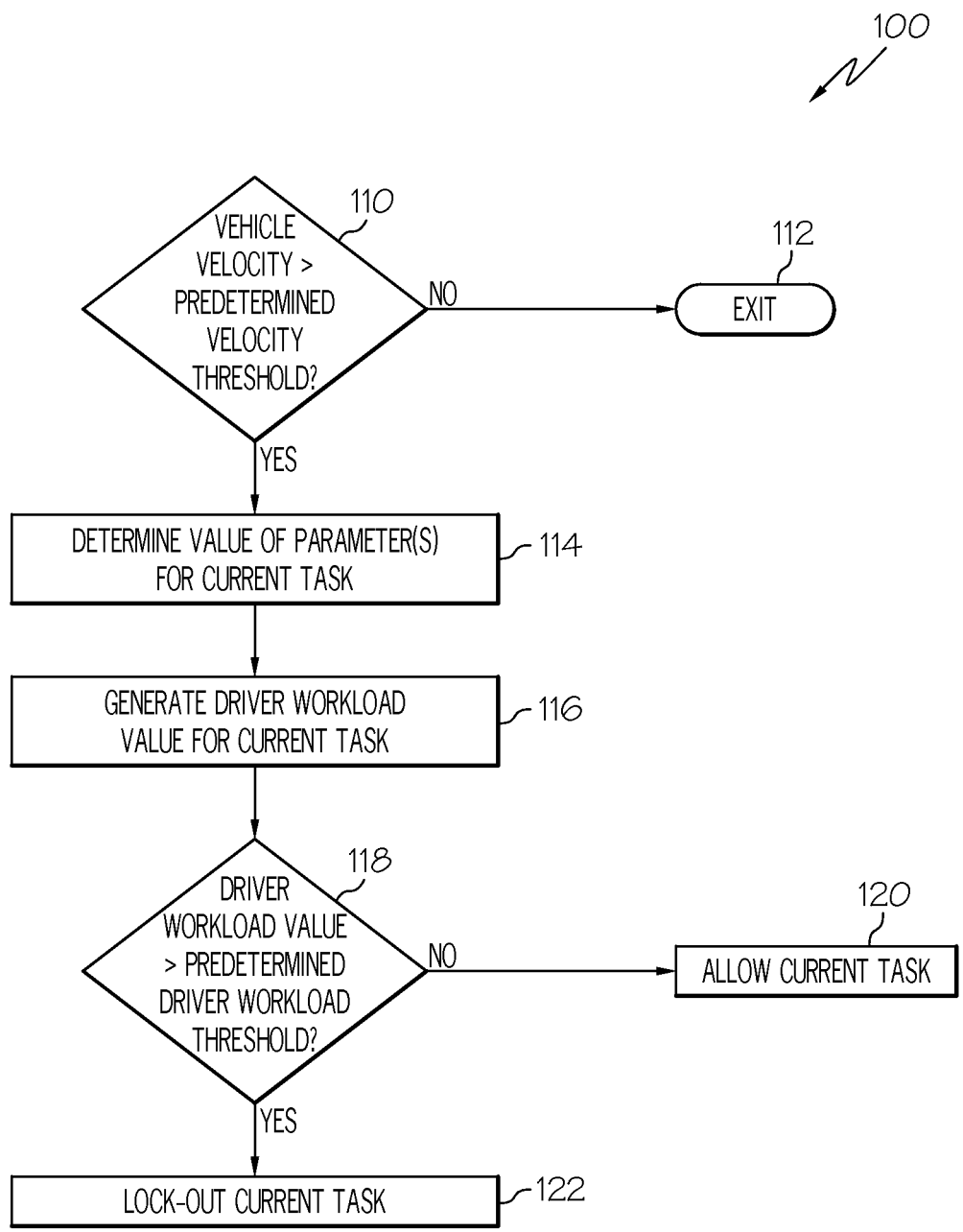
FIG. 2 is a flowchart of an exemplary method for determining when a task may be performed on a vehicle.

FIG. 1 is a block diagram of an exemplary vehicle 10 according to one embodiment. Vehicle 10 includes a chassis 12, a body 14, and four wheels 16. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

Vehicle 10 also includes an electronic control system 20. Although not shown in detail, electronic control system includes a plurality of sensors and automotive control modules or electronic control units (ECUs) that control various systems within vehicle 10. In the depicted embodiment, electronic control system 20 includes sensors 22, 23, 24, wireless data interface 26, user interface 28, processor 30, and memory 32. As depicted, sensors 22-24, wireless data interface 26, and user interface 28 are each coupled to processor 30 via a data communication link 34. In one embodiment, data communication link 34 comprises an onboard data communication bus that transmits data, status and other information or signals between various components of vehicle 10. Onboard data communications bus 34 may comprise any suitable physical or logical means of connecting computer systems and components.

It should be noted that sensors 23-24, wireless data interface 26, user interface 28, processor 30, and memory 32 may be components within one or more of the automotive control modules or ECUs of electronic control system 20. In one embodiment, processor 30, memory 32, wireless data interface 26, and user interface 28 comprise components of a vehicular infotainment or telematics system. However, vehicle 10 may also have the functionality of processor 30, memory 32, wireless data interface 26, and/or user interface 28 distributed across more than one ECU as well.

Sensors 22-24 generate data describing the motion of vehicle 10, the environment surrounding vehicle 10, and/or other attributes or conditions related to vehicle 10. In one embodiment, sensors 22-24 include one or more sensors, accelerometers, and other devices that generate data describing the velocity, the angular velocity, the acceleration rate, and other variables describing the motion of vehicle 10. In addition, sensors 22-24 may include various devices that generate data describing the environment surrounding vehicle 10, including the temperature, the presence of rain, snow, or other precipitation, road conditions (e.g., wet, icy, bumpy, potholed, etc.), the distance between vehicle 10 and other vehicles in the area, and other attributes of the environment surrounding vehicle 10.

Wireless data interface 26 is coupled to processor 30 and is configured to communicate with various remote devices via one or more wireless technologies. Wireless data interface 26 may utilize a wireless technology such as Bluetooth® or WiFi to communicate with wireless data interfaces on other vehicles, wireless network access points, and/or other remote devices. Further, wireless data interface 26 may include a cellular modem that is coupled to a cellular phone. In this case, the cellular phone connects the wireless modem to an Internet Service Provided (ISP) modem or other telephonic network access point. Although examples of wireless technologies are described herein, it should be noted that wireless data interface 26 may utilize other wireless technologies as well, such as data short range communications (DSRC).

User interface 28 is coupled to processor 30 and configured to provide various user interfaces, controls, and other content that enable a user of vehicle 10 (e.g., a driver of a passenger) to perform one or more predetermined secondary vehicle functions. Examples of such secondary vehicle functions include selecting a desired point-of-interest, selecting a name or address from a stored contact list, initiating a cellular telephone call, selecting multimedia content for playback on vehicle 10, and other useful functions. Such secondary functions are performed at the discretion of the user as opposed to the primary functions that are necessary to operate vehicle 10, such as steering, throttle, and braking. In the depicted embodiment, user interface 28 comprises a touch-screen display 40 that renders various user interfaces (e.g., menu-based interfaces, list-based interfaces, alphanumeric keypad interfaces, etc.) and other content in response to commands from processor 30 and receives input from a user of vehicle 10 by detecting the presence of the user's touch within a display area.

Each secondary function that may be performed via user interface 28 includes at least one component task or sequence of tasks. As used herein, the term "task" refers to a discrete action or step, or a discrete series of actions or steps, that a user of vehicle 10 performs as part of a corresponding secondary function. Examples of such tasks include selecting a desired menu-item on a paged menu display (hereinafter, a "menu-selection task") that is rendered on touch-screen display 40 as part of a menu-based interface for performing a predetermined function, selecting a desired list-item from a paged list display (hereinafter, a "list-selection task") that is rendered on touch-screen display 40 as part of a list-based interface for performing a predetermined function, and entering a desired string of alphanumeric characters on an alphanumeric keypad display (hereinafter, a "alphanumeric keypad task") that is rendered on touch-screen display 40 as part of an alphanumeric keypad interface for performing a predetermined function.

It will be understood by one skilled in the art that user interface 28 may also be realized using other display devices for displaying user interfaces (e.g., GUIs) and other content to a user of vehicle 10, such as a liquid crystal display (LCD), a thin film transistor (TFT) display, a plasma display, a light emitting diode (LED) display, or an organic light emitting diode (OLED) display, to name a few. In addition, alternative embodiments of user interface 28 may include various other user input devices for receiving input from a user of vehicle 10, such as a keypad, a touchpad, a mouse, a joystick, or a keyboard.

Processor 30 may comprise any type of processor or multiple processors, single integrated circuits such as a microprocessor, or any suitable number of integrated circuit devices and/or circuit boards working in cooperation to accomplish the functions of a processing unit. During operation, processor 30 executes one or more instructions preferably stored within memory 32.

Memory 32 can be any type of suitable memory, including various types of dynamic random access memory (DRAM) such as SDRAM, various types of static RAM (SRAM), and various types of non-volatile memory (PROM, EPROM, and flash). It should be understood that the memory 32 may be a single type of memory component, or it may be composed of many different types of memory components. As noted above, memory 32 stores instructions for executing one or more methods including embodiments of the methods for determining when a task may be performed on a vehicle described below. In addition, memory 32 may be configured to store various other data as further described below.

Processor 30, executing instructions stored in memory 32, determines when a task (hereinafter, the "current task") may be performed by a user of vehicle 10, while vehicle 10 is moving. In one embodiment, the current task corresponds to a secondary function (hereinafter, the "current secondary function") that a user of vehicle 10 is attempting to perform. However, the current task may comprise any task that may be performed by a user of vehicle 10 via user interface 28.

As further described below, processor 30 generates a driver workload value for the current task and compares the driver workload value to a predetermined driver workload threshold. If the generated driver workload value is greater than the driver workload threshold and the velocity of vehicle 10 exceeds a predetermined velocity threshold (e.g., 5 miles per hour), the current task is locked-out (e.g., a user of vehicle 10 is prevented from performing the current task). Alternatively, if the driver workload value for does not exceed the predetermined driver workload threshold, the user is permitted to perform the current task.

In one embodiment, the current task is associated with a calibration code that is used to determine when the current task may be performed. A user of vehicle 10 is permitted to perform the current task when the associated calibration code has a first value (e.g., 1 or TRUE). Alternatively, the current task is locked-out when its associated calibration code has a second value (e.g., 0 or False). In this case, processor 30 locks-out the current task by assigning the appropriate value to the appropriate calibration code. Other techniques may also be used to selectively enable or lock-out the current task.

The driver workload value is a variable value that is generated based on one or more predetermined parameters associated with the current task, such as one or more task parameters, vehicle parameters, driver state parameters, and/or other parameters that that influence a driver's ability to perform the current task when vehicle 10 is moving. Task parameters describe attributes of the current task that influence the task's potential to distract the driver of vehicle 10. Vehicle parameters describe attributes of vehicle 10, attributes of the environment surrounding vehicle 10, and/or other attributes that are related to vehicle 10 and influence the driver's ability to simultaneously interact with user interface 28 and control vehicle 10. Further, driver state parameters describe attributes related to the current impairment level, alertness level, or other attributes affecting the driver's ability to operate vehicle 10. Descriptions of some exemplary task parameters, vehicle parameters, and driver state parameters are provided below.

Exemplary task parameters include a task status parameter, a task type parameter, and one or more task structure parameters. The task status parameter describes the current status or progress of the current task. In general tasks that have been previously completed, or partially completed, have less potential to distract the driver of vehicle 10 relative to newly initiated tasks. This is because after a task is completed or partially completed there are fewer remaining steps for the driver to perform. Thus, the task status parameter distinguishes newly initiated instances of the current task from completed or partially completed (and less distracting) instances of the current task.

In one embodiment, the task status parameter corresponds to one of a plurality of predetermined statuses, including a newly initiated status, a pending status, a terminated status, and a completed status. In this case, the task status parameter corresponds to the newly initiated status if a user of vehicle 10 has not previously initiated an instance of the current task during the course of performing the current secondary function. Alternatively, the task status parameter corresponds to the pending status if there is an instance of the current task that a user of vehicle 10 previously initiated and did not complete or terminate during the course of performing the current secondary function. Further, the task status parameter corresponds to the terminated status if a user of vehicle 10 has previously initiated and then terminated an instance of the current task during the course of performing the current secondary function. Finally, the task status parameter corresponds to the completed status if a user of vehicle 10 has previously completed the current task during the course of performing the current secondary function.

The task type parameter identifies one of a plurality of predetermined task types that corresponds to the current task. In one embodiment, the plurality of predetermined task types includes a menu-selection task type corresponding to menu-selection tasks, a list-selection task type corresponding to list-selection tasks, and an alphanumeric keypad task type corresponding to alphanumeric keypad tasks. However, it should be understood that alternative embodiments may utilize any combination of the task types mentioned above and/or alternative task types.

A task structure parameter describes a predetermined attribute of the structure of the current task that affects the task's potential to distract the driver of vehicle 10. In one embodiment, the attributes described by the task structure parameter(s) vary based on the current task. For example, if the current task is a menu-selection task, the task structure parameter(s) may describe attributes associated with selecting a menu-item from a paged-menu display. Examples of such task structure parameters include a menu-depth parameter describing the number of menu-items within the paged menu display, a menu-breadth parameter describing the number of menus and submenus that a user of vehicle 10 must navigate to access the paged menu display, and an items-per-page parameter describing the number of menu-items that are displayed on each page of the paged menu display.

Exemplary vehicle parameters include vehicle motion parameters and vehicle environment parameters. The vehicle motion parameters describe attributes of the motion of vehicle 10 and may include a velocity parameter describing the current velocity of vehicle 10, an angular velocity parameter describing the current angular velocity of vehicle 10, an acceleration parameter describing the current acceleration of vehicle 10, and other parameters related to the motion of vehicle 10. The vehicle environment parameters describe attributes related to the current environment surrounding vehicle 10 and may include a weather parameter describing the weather conditions (e.g., wind, rain, snow, etc.) in the area where vehicle 10 is located, a road condition parameter describing condition of the road (e.g., dry, wet, icy, bumpy, potholed, etc.) on which vehicle 10 is traveling, a traffic parameter describing local traffic conditions, and other parameters that describe the environment surrounding vehicle 10.

Finally, exemplary driver state parameters include the driver's blood alcohol level, heart rate, pupil dilation, and other parameters indicative of the impairment or alertness level of the driver of vehicle 10. In one embodiment, the values of these driver state parameters are determined based on data generated by a non-illustrated driver monitoring system or other onboard biometric monitoring system within vehicle 10.

FIG. 2 is a flowchart of an exemplary method 100 for determining when a task (e.g., the current task) may be performed on a vehicle. With reference to FIGS. 1 and 2, in one embodiment method 100 is executed by processor 30 in response to input received from a user of vehicle 10. For example, processor 30 may execute method 100 in response to a user's request to perform the current task. In another example, processor 30 executes method 100 in response to a user's request to view user interface content that includes an option (e.g., a selectable control) that the user may select to perform the current task. As further described below, processor 30 may be configured to perform method 100 in accordance with other criteria as well.

During step 110, processor 30 determines if vehicle 10 is moving. In the depicted embodiment, processor 30 compares the velocity of vehicle 10 to a predetermined threshold (e.g., 5 miles per hour). In this case, if the velocity of vehicle 10 does not exceed the predetermined velocity threshold, then processor 30 proceeds to step 112 and method 100 is terminated. Alternatively, if the velocity of vehicle 10 does exceed the predetermined velocity threshold, then processor 30 proceeds to step 114. It should be noted that alternative embodiments may utilizes other criteria to determine when vehicle 10 is moving.

During step 114, processor 30 determines values for one or more parameters that are associated with the current task. As described above, the current task is associated with one or more predetermined parameters, including task parameters, vehicle parameters, and/or driver state parameters. In one embodiment, processor 30 determines the values for a task status parameter, a task type parameter, and one or more task structure parameters during step 114. Processor 30 may determine the values of the task status parameter, the task category parameter, and the one or more task structure parameters based on one or more tables or databases that are stored in memory 32 and include information describing the current status, type, and structure of the current task. Further, it should be noted that in alternative embodiment processor 30 may determine the values of other task parameters and/or other combinations of the task parameters described above during step 114.

In addition, in some embodiments processor 30 determines the value of one or more vehicle parameters for the current task during step 114. As noted above, vehicle parameters may include vehicle motion parameters, vehicle environment parameters, or other vehicle parameters associated with the current task. Processor 30 determines the values of the vehicle parameters based on data received from sensor(s) 22, another ECU, wireless data interface 26, and/or from other data sources. Finally, processor 30 may also determine values for one or more driver state parameters for the current task.

Next, processor 30 generates a driver workload value for the current task (step 116). The driver workload value is a variable value and is generated by processor 30 based on the parameter values determined during step 114. In one embodiment, processor 30 utilizes a predetermined function to generate the driver workload value. In this case, the function arguments include the parameter values determined during step 114 and the function output includes the driver workload value.

Processor 30 then determines if the generated driver workload value exceeds a predetermined driver workload threshold for the current task (step 11 8). If the generated driver workload value does not exceed the driver workload threshold value, processor 30 allows a user of vehicle 10 to perform the current task (step 120). Conversely, if the generated driver workload value exceeds the driver workload threshold, processor 30 locks-out the current task (step 122). As noted above, in one embodiment processor 30 locks-out the current task by assigning a predetermined value to the appropriate calibration code.

When the current task is locked-out, processor 30 commands user interface 28 to notify the user of vehicle 10 that the current task is unavailable. For example, processor 30 may command user interface 28 to display a message that notifies the user that the current task is not available. Alternatively, processor 30 may command user interface to "grey-out" or otherwise disable a control that a user of vehicle 10 would select to perform the current task.

It should be noted that although processor 30 performs method 100 in response to input from the user in the embodiments described above, in alternative embodiments processor 30 may perform method 100 or certain steps of method 100 in accordance with other criteria. For example, processor 30 may be configured to execute steps 114, 116, 118, 120, and/or 122 of method 100 when vehicle 10 accelerates past the predetermined velocity threshold (e.g., 5 miles per hour). Further, processor 30 may be configured to execute steps 114, 116, 118, 120 and/or 122 of method 100 periodically (e.g., once every 20 seconds) while the velocity of vehicle 10 exceeds the predetermined velocity threshold.

Further processor 30 may be configured to perform steps 114, 116, 118, and 120 at different times. For example, processor 30 may be configured to perform steps 114 and 116 when vehicle 10 accelerates past the predetermined velocity threshold and/or periodically while the velocity of vehicle 10 exceeds the predetermined threshold velocity. Processor 30 may then store the generated driver workload value for subsequent comparison with the driver workload threshold (e.g., at the time a user of vehicle 10 generates a request to perform the current task or a request for user interface content that includes the option to perform the current task).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for determining when a task may be performed on a vehicle, the method comprising:
generating a driver workload value based on at least one task parameter describing a predetermined attribute of the task, the predetermined attribute comprising a task status parameter comprising a measure of how recently the task has been initiated; and
preventing a user from performing the task if the driver workload value exceeds a predetermined driver workload threshold and the vehicle is moving.

2. The method of claim 1, further comprising determining an environment parameter pertaining to a current environment surrounding the vehicle, wherein the step of generating the drive workload value comprises the step of generating the driver workload value based on the at least one task parameter and the environment parameter.

3. The method of claim 1, further comprising determining a driver alertness parameter pertaining to a measure of alertness of the driver, wherein the step of generating the drive workload value comprises the step of generating the driver workload value based on the at least one task parameter and the driver alertness parameter.

4. The method of claim 1, wherein the value of the task status parameter corresponds to one of a newly initiated status, a pending status, a terminated status, and a completed status.

5. The method of claim 2, wherein the environment parameter comprises one or more weather conditions proximate the vehicle.

6. The method of claim 2, wherein the environment parameter comprises a condition of a road on which the vehicle is travelling.

7. The method claim 2, wherein the environment parameter comprises a measure of traffic on a route in which the vehicle is travelling.

8. The method of claim 3, wherein the driver alertness parameter comprises a measure of impairment of the driver.

9. The method of claim 3, wherein the driver alertness parameter comprises a biometric measure of the driver based on data generated by a biometric monitoring of the driver.

10. A system for determining when a task may be performed on a vehicle, the system comprising:
a user interface for receiving input from a user of the vehicle;
a processor coupled to the user interface and configured to:
generate a driver workload value in response to input from the user, wherein the driver workload value is based on at least one task parameter describing an attribute of the task and at least one vehicle parameter describing an attribute of the vehicle parameter, the attribute of the task comprising a task status parameter comprising a measure of how recently the task has been initiated; and lock-out the task if the driver workload value exceeds a predetermined driver workload threshold and the velocity of the vehicle exceeds a predetermined velocity threshold.

11. The system of claim 10, wherein the processor is further configured to:
   determine an environment parameter pertaining to a current environment surrounding the vehicle; and
   generate the driver workload value based on the at least one task parameter and the environment parameter.

12. The system of claim 11, wherein the at least one task parameter comprises a task status parameter that identifies the current status of the task.

13. The system of claim 12, wherein the current status of the task is one of a newly initiated status, a pending status, a terminated status, and a completed status.

14. The system of claim 12, wherein the processor is further configured to:
   determine a driver alertness parameter pertaining to a measure of alertness of the driver; and
   generate the drive workload value based on the at least one task parameter and the driver alertness parameter.

15. The system of claim 11, wherein the environment parameter comprises one or more weather conditions proximate the vehicle.

16. The system of claim 11, wherein the environment parameter comprises a condition of a road on which the vehicle is travelling.

17. The system of claim 14, wherein driver alertness parameter comprises a measure of impairment of the driver.

18. A method for determining when a user of a vehicle may perform a task on a user interface, the method comprising:
   determining a value of at least one task parameter that describes an attribute of the task;
   determining at least one vehicle parameter that describes an attribute of the vehicle;
   determining at least one environment parameter that comprises an attribute of an environment surrounding the vehicle;
   generating a driver workload value, wherein the driver workload value is a function of the at least one task parameter, the environment parameter, and the at least one vehicle parameter; and
   locking-out the task if the driver workload value exceeds a predetermined driver workload value and the velocity of the vehicle exceeds a predetermined velocity threshold;
   wherein the at least one task parameter comprises a task status parameter, a task type parameter, and a task structure parameter and the step of determining further comprises:
      determining the value of the task status parameter based on the current status of the task, wherein the current status of the task is one of a newly initiated status, a pending status, a terminated status, and a complete status;
      determining the value of the task type parameter based on a task type that corresponds to the task, wherein the task type is one of a menu-selection task type, a list-selection task type, and an alphanumeric keypad task type; and
      determining the value of the task structure parameter based on a predetermined attribute of the structure of the task.

19. The method of claim 18, wherein the at least one vehicle parameter further comprises a vehicle motion parameter and a vehicle environment parameter and the step of determining further comprises: determining the value of the vehicle motion parameter based on a predetermined attribute of the motion of the vehicle; and determining the value of the vehicle environment parameter based on a predetermined attribute of the environment of the vehicle further comprising the step of:
   determining a measure of alertness of the driver;
      wherein the workload value is a function of the at least one task parameter, the environment parameter, the measure of driver alertness, and the at least one vehicle parameter.

* * * * *